United States Patent

Tonks

[11] Patent Number: 5,475,900
[45] Date of Patent: Dec. 19, 1995

[54] CABLE HOLDER

[76] Inventor: Paul A. Tonks, 164 Grandview Ave., Thornhill Ont., Canada, L3T 1J1

[21] Appl. No.: 787,121

[22] Filed: Nov. 4, 1991

[51] Int. Cl.$^6$ ............................................. B65D 63/00
[52] U.S. Cl. ............................................. 24/16 R; 24/20 R
[58] Field of Search ............................. 24/16 R, 17 R, 24/17 B, 20 R

[56] References Cited

U.S. PATENT DOCUMENTS

| | | | |
|---|---|---|---|
| 4,024,604 | 5/1977 | Klimek et al. | 24/16 R |
| 4,148,113 | 4/1979 | Dvorachek | 24/16 R |
| 4,870,722 | 10/1989 | Shell, Jr. | 24/16 R |
| 5,093,964 | 3/1992 | Rowland | 24/16 R |

Primary Examiner—Laurie K. Cranmer

[57] ABSTRACT

A holder device for use in coiling an elongate material e.g. a wire, cable, rope or the like, has a pair of opposed side walls extending upwardly from a base portion and forming with the base portion an upwardly open recess for receiving successive turns of the coiled elongate material. The base portion includes a base extension portion which projects beyond the side walls and the recess. A strap portion is provided for securing the turns of the elongate material in the recess and is connected at one end thereof to one side of the base extension. A strap retainer portion is provided at an opposite side of the base extension portion and is engageable with the strap portion for securing the turns of the elongate material in the recess, the strap portion and the strap portion retainer being offset from the side walls so as to avoid obstruction of the strap portion by the side walls.

4 Claims, 2 Drawing Sheets

CABLE HOLDER

BACKGROUND OF THE INVENTION

1. Field of the Invention

The present invention relates to holder devices for collecting and storing wires, cables, and similar elongate materials in a uniform manner.

2. Description of the Related Art

The commonly used procedure for collecting cables and similar materials by gripping one end of the cable in one hand, running the other hand down the cable to a comfortable arms length, gripping the cable at this point, then bringing this section back to the first hand, placing the cable in this hand, and then repeating this procedure over and over again until all the desired cable is collected and secured in one hand, will for further reference be called "loose-looped collecting procedure".

When this common "loose-looped collecting procedure" is used, it is common that upon completion of collecting, in whole or in part, the cable or similar material is bound at one or more points of the circumference of the loop. Strapping or tying products are adequate in tying the material together but do not maintain uniformity of the material during storage or handling, and in particular, upon releasing. These devices do not allow for sequential release of the material in reverse of the sequence in which it was collected. It is common that upon releasing of the material the material has tangled. Other collecting devices must abandon this "loose-looped collecting procedure" and use various methods of winding around various spool devices.

BRIEF SUMMARY OF THE INVENTION

The present invention co-operates with this "loose-looped collecting procedure" during the time of collecting, in whole or in part, and during storage and handling. The present invention increases the uniform stability of the material during collecting, storage and handling. By maintaining this uniformity, and by releasing the material better in sequence, less tangling will occur.

BRIEF DESCRIPTION OF THE DRAWINGS

In drawings which illustrate a preferred embodiment of the invention.

The Preferred Embodiment

Figure 1:
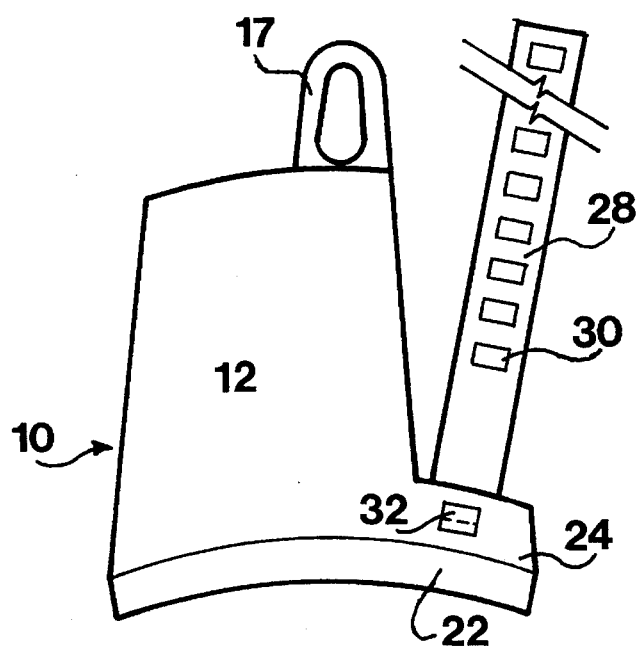
FIG. 1 is a front view of a holder device.
Figure 2:
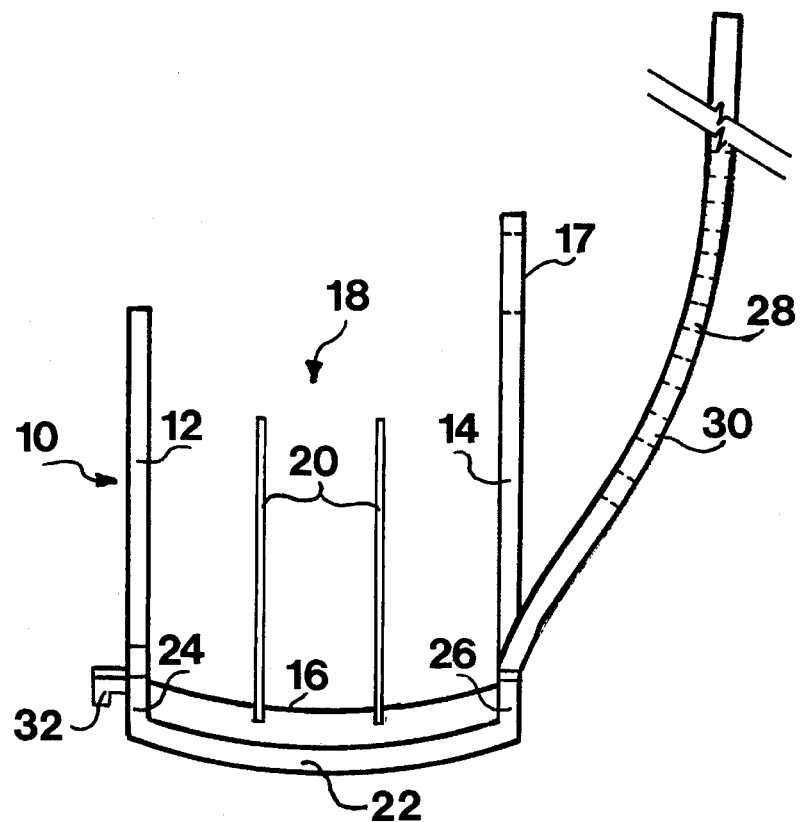
FIG. 2 is a side view of the device and FIG. 3 is a top view of the device.
Figure 3:
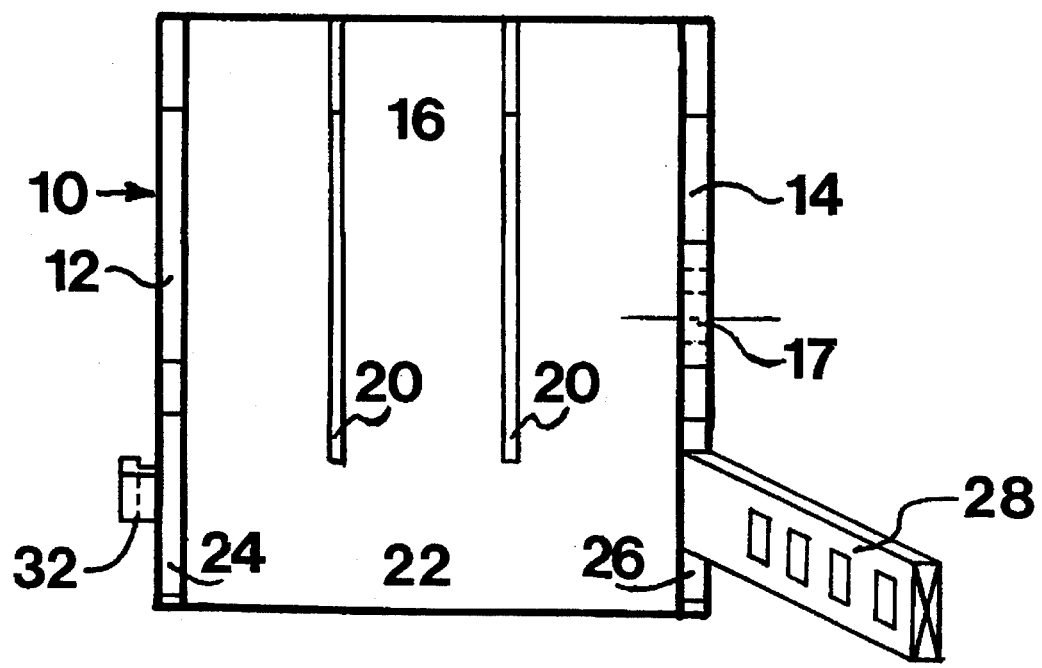

The holder device illustrated in the drawings and indicated generally by reference numeral 10 has a pair of opposed parallel flat side walls 12 and 14 extending vertically upwardly, as viewed in FIGS. 1 and 2, from a curved base 16. The top of the side wall 14, is extended to form an eye portion 17.

The side walls 12 and 14 and the base 16 co-operate to form between the side walls an upwardly open recess which is indicated generally by reference numeral 18 and which serves to receive successive turns of a coil of an elongate material, e.g. a cable, as described in greater detail below.

Between the side walls 12 and 14, the recess 18 is subdivided by flat vertical partition walls 20 which extend upwardly from the base 16 and are parallel to the side walls 12 and 14.

The base 16 has a base extension 22 which, as viewed in FIG. 1, projects to the right beyond the side walls 12. The base extension 22 includes, at its opposite sides, a pair of upwardly extending flanges 24 and 26 which form extensions of the side walls 12 and 14 but which have a height which is substantially less than that of the side walls 12 and 14, as is readily apparent from FIG. 1.

An elongate flexible strap portion 28 extends from the top of the flange 26 and is formed with a plurality of rectangular openings 30, which are spaced-apart along the length of the strap portion 28.

The flange 24 is formed at its outer side with a hook-shaped retainer 32, which is engageable in the openings 30 of the strap member 28 for retaining the strap member 28.

The base 16 has a double curvature, i.e. the base 16 is downwardly concavely curved as viewed in FIG. 1 and is downwardly convexly curved as viewed in FIG. 2.

By positioning the holder device 10 in the palm of the hand (for example, the left hand) and the thumb in position for holding back the strap portion 28, the thumb is placed over the device which allows the device to be held firmly and ready for the collecting procedure. The end of the cable or similar elongate material is placed over the base 16 and the base extension 22 and the thumb is pressed down on the elongate material to hold it in place. While the left hand continues to hold the material firmly against the base extension 22 by the thumb, the right hand slides down the material to a desired arms length. The right hand then grips the material at this point and then brings it back and places this point of the material onto the base 16. The thumb of the hand holding the device 10 is then carefully maneuvered over both turns of the cable and firmly presses down to hold these turns uniformly against the device 10. This procedure is repeated over and over again until all the desired material is collected in a coil.

The partitions 20 divide the recess 18 into smaller compartments which facilitate the uniform collection of the successive turns of material.

Upon completion of the coiling of tile required amount of the material, the flexible strap portion is drawn over the material and fastened to the base portion 22 by means of the retainer 32. The material has now been uniformly collected and is firmly secured in a uniform and secure manner. This device will enhance the uniform storage of the material during storage or handling.

When it is desired to release the material, in whole or in part, the device is held in the same position of the hand as when collected. The strap portion 28 is removed from over the material and the thumb is pressed down on the material, thus ensuring that only the desired turns or loops are released. The right lifts and successively releases the turns from the device in a sequence which is the reverse of the sequence in which the turns of the material were collected. If only part of the material collected is desired to be released, the operator releases this amount and then securely restraps the remaining material in the device by means of the strap portion 28.

This invention allows for material, to be collected, released or stored, in whole or in part, in a more uniform manner, lessening the possibility of tangling.

This invention allows for material, to be collected, released or stored, in whole or in part, in a more uniform manner, lessening the possibilities of tangling.

We claim:

1. A holder device for use in coiling an elongate material, comprising:

a base portion;

a pair of opposed side walls extending upwardly from said base portion and forming with said base portion an upwardly open recess for receiving successive turns of a coiled elongate material;

said base portion including a base extension portion which projects beyond said side walls and the recess;

a strap portion for securing the turns of the elongate material in the recess;

said strap portion being connected at one end thereof to one side of said base extension portion; and a strap portion retainer at an opposite side of said base extension portion and engageable with said strap portion for securing the turns of the elongate material in the recess;

said strap portion and said strap portion retainer being offset from said side walls so as to avoid obstruction of said strap portion by said side walls.

2. A holder device as claimed in claim 1, further comprising partition walls extending upwardly from said base between said side walls, said strap portion and said retainer being offset from said partition walls so as to avoid obstruction of said strap portion by said partition walls.

3. A holder device as claimed in claim 1, wherein said base has a double curvature.

4. A holder device as claimed in claim 1, wherein said base extension includes upwardly extending flanges which form extensions of said side walls, and said strap portion and said strap portion retainer are provided on said flanges.

* * * * *